United States Patent
Son

(10) Patent No.: US 9,831,797 B2
(45) Date of Patent: Nov. 28, 2017

(54) COPY SYSTEM FOR COPYING PARAMETER OF INVERTER

(71) Applicant: LSIS CO., LTD., Anyang-si, Gyeonggi-do (KR)

(72) Inventor: Ju Beom Son, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 206 days.

(21) Appl. No.: 14/327,238

(22) Filed: Jul. 9, 2014

(65) Prior Publication Data

US 2015/0036399 A1    Feb. 5, 2015

(30) Foreign Application Priority Data

Aug. 5, 2013  (KR) .......................... 10-2013-0092382

(51) Int. Cl.
*H02M 7/44* (2006.01)
*H02M 7/48* (2007.01)
*H02M 7/5387* (2007.01)

(52) U.S. Cl.
CPC ............... *H02M 7/44* (2013.01); *H02M 7/48* (2013.01); *H02M 7/53873* (2013.01)

(58) Field of Classification Search
CPC ....... H02M 7/53873; H02M 7/48; H02M 7/44
See application file for complete search history.

(56) References Cited

U.S. PATENT DOCUMENTS

| 2003/0233536 A1* | 12/2003 | Chheda ............... G06F 9/44547 713/1 |
| 2005/0044313 A1* | 2/2005 | Amemiya ............. G06F 3/0605 711/114 |
| 2005/0190393 A1* | 9/2005 | Bledsoe .................... G06F 8/65 358/1.13 |

(Continued)

FOREIGN PATENT DOCUMENTS

| CN | 102474195 | 5/2012 |
| EP | 2463999 | 6/2012 |

(Continued)

OTHER PUBLICATIONS

Japan Patent Office Application Serial No. 2014-157451, Office Action dated Sep. 1, 2015, 3 pages.

(Continued)

*Primary Examiner* — Ryan Jarrett
(74) *Attorney, Agent, or Firm* — Lee, Hong, Degerman, Kang & Waimey

(57) ABSTRACT

The present invention relates to a copy system for copying parameter of inverter configured to improve portability and convenience by copying parameter of inverter through synchronization utilizing a smart copier, and to easily, simply and quickly perform parameter copying of inverter, wherein the system includes a smart copier stored with a parameter, and an inverter configured to be controlled by a parameter copied from the smart copier, and wherein the smart copier selects parameters that are grouped and stored for each usage, and transmits the parameters to the inverter for (Continued)

configuration of the inverter, the inverter stores the parameters transmitted from the smart copier, and is controlled in response to the parameters by reading the stored parameters while the inverter is turned on.

5 Claims, 4 Drawing Sheets

(56) References Cited

U.S. PATENT DOCUMENTS

| | | | | |
|---|---|---|---|---|
| 2006/0109505 A1* | 5/2006 | Ha | ............... | H04N 1/00244 358/1.15 |
| 2011/0231456 A1* | 9/2011 | Choi | ............... | G05B 19/0423 707/822 |
| 2012/0173766 A1* | 7/2012 | Yoshimura | ............... | H02M 7/53873 710/8 |
| 2012/0235783 A1* | 9/2012 | Lee | ............... | G05B 19/042 340/4.3 |
| 2013/0053987 A1* | 2/2013 | Galt | ............... | G05B 19/0423 700/12 |
| 2013/0198443 A1 | 8/2013 | Braun et al. | | |

FOREIGN PATENT DOCUMENTS

| | | |
|---|---|---|
| JP | 61-150005 | 7/1986 |
| JP | 07-337027 | 12/1995 |
| JP | 2000-040003 | 2/2000 |
| JP | 2003-295910 | 10/2003 |
| JP | 2003-339169 | 11/2003 |
| JP | 2003339169 | 11/2003 |
| JP | 2006-20390 | 1/2006 |
| JP | 2007-228764 | 9/2007 |
| JP | 2013-70460 | 4/2013 |
| KR | 101168549 | 7/2012 |
| WO | 2011/016137 | 2/2011 |

OTHER PUBLICATIONS

European Patent Office Application Serial No. 14177264.0, Search Report dated Mar. 11, 2015, 6 pages.
Japan Patent Office Application Serial No. 2014-157451, Office Action dated May 10, 2016, 3 pages.
State Intellectual Property Office of the People's Republic of China Application Serial No. 201410384590.2, Office Action dated Dec. 28, 2016, 6 pages.
Korean Intellectual Property Office Application No. 10-2013-0092382, Office Action dated Jun. 21, 2017, 4 pages.

* cited by examiner

COPY SYSTEM FOR COPYING PARAMETER OF INVERTER

CROSS-REFERENCE TO RELATED APPLICATIONS

Pursuant to 35 U.S.C.§119 (a), this application claims the benefit of earlier filing date and right of priority to Korean Patent Application No. 10-2013-0092382 filed on Aug. 5, 2013, the contents of which are all hereby incorporated by reference herein in its entirety.

BACKGROUND OF THE INVENTION

Field of the invention

The teachings in accordance with the exemplary embodiments of this present invention generally relate to a copy system for copying parameter of inverter, and more particularly to a copy system for copying parameter of inverter configured to improve portability and convenience by copying parameter of inverter through synchronization utilizing a smart copier, and to easily, simply and quickly perform parameter copying of inverter.

Description of Related Art

Recently, most of product manufacturing lines are more automated than the conventional ones, and a driving system includes a motor configured to perform an automation system. A plurality of inverters is required for precise control of a plurality of motors, and a device like a PLC (Programmable Logic Controller) is widely used for controlling the plurality of inverters.

When a plurality of inverters is initially installed after shipment of the inverters from a factory, or an inverter is used for control of other devices, an inverter parameter must be configure. At this time, current methods for performing a parameter copy in an inverter includecopying in an inverter parameter stored in a PC while a power is connected to the inverter, and personally configuring, by a user, parameter in an inverter using a keypad of the inverter.

However, the conventional parameter copying method suffers from a disadvantage in that a user must configure each parameter and it takes long time to copy to the inconvenience to the user.

Another disadvantage is that when the number of parameters to be configure increases, there may be generated an accident in which erroneous parameters are configure.

Still another disadvantage is that a user must perform a repeated operation of erasing and rewriting parameters by connecting a PC to an inverter through a user's keypad manipulation when other parameters are to be configured on an inverter, which also creates inconvenience and incurs lots of time to the user.

Still further disadvantage is that a power system is required for an inverter in a method of configuring a parameter using PC connection, for which a PC must be carried to result in environmental restriction.

SUMMARY OF THE INVENTION

The present invention has been made to solve the foregoing disadvantages/problems of the prior art and therefore an object of certain embodiments of the present invention is to provide a copy system for copying parameter of inverter configured to improve portability and convenience by copying parameter of inverter through synchronization utilizing a smart copier, and to easily, simply and quickly perform parameter copying of inverter.

In one general aspect of the present invention, there is provided a copy system for copying parameter of inverter, the system comprising:

a smart copier stored with a parameter; and an inverter configured to be controlled by a parameter copied from the smart copier, wherein the smart copier selects parameters that are grouped and stored for each usage, and transmits the parameters to the inverter for configuration of the inverter, the inverter stores the parameters transmitted from the smart copier, and is controlled in response to the parameters by reading the stored parameters while the inverter is turned on, and wherein the smart copier includes a parameter storage stored with parameters by grouping the parameters for each usage, a parameter selector configured to output a parameter selection signal for selection of parameters stored in the parameter storage, and a smart copier controller configured to transmit a selected parameter to the inverter by selecting the parameter stored in the parameter storage in response to the parameter selection signal, and wherein the inverter includes a write memory to be stored with parameters transmitted from the smart copier controller, and an inverter controller configured to control the inverter in response to the parameters by reading the parameters stored in the write memory.

Preferably, but not necessarily, the smart copier may include a power supplier configured to supply a power necessary for operation of the smart copier.

Preferably, but not necessarily, the smart copier may further include a downloader configured to output a download execution signal for executing a download of a firmware, a firmware storage configured to store the downloaded firmware for each group, and a firmware selector configured to output a firmware selection signal for selecting firmware stored in the firmware storage, wherein the smart copier controller stores firmware in the firmware storage by downloading the firmware in response to the download execution signal, and transmits the firmware to the inverter by selecting the firmware in response to the firmware selection signal.

Preferably, but not necessarily, the inverter may further include a read memory configured to store parameters read out from the write memory, wherein the inverter controller reads the parameters stored in the read memory.

ADVANTANGEOUS EFFECTS

The copy system for copying parameter of inverter according to the present invention has an advantageous effect in that no separate outside power is required because of there being provided a power supplier on a smart copier to thereby improve portability and convenience.

Another advantageous effect is that parameters stored in a smart copier can be transmitted to an inverter while the smart copier is being connected to the inverter, and synchronization, in which parameters stored in a memory is uploaded don an inverter controller when the inverter is turned on, is realized by the inverter itself to allow easy, simple and quick performance of parameter copying of inverter. Still another advantageous effect is that the smart copier according to the present invention includes a firmware download function to enable enhancement of functionality and efficiency.

Still further advantageous effect is that, because a smart copier is stored and grouped with parameters and firmware for each usage, several types of inverters can be configured using one smart copier when inverters are configured by copying parameters on inverters of mutually different types.

DETAILED DESCRIPTION OF THE INVENTION

Hereinafter, exemplary embodiments of the present invention will be described in detail with reference to the accompanying drawings. As used in the present invention, it is to be understood that the sizes and the shapes of the components shown in some of the drawings are illustrated in an exaggerated scale for the sake of clarity in explanation. In addition, the terms specifically defined herein in consideration of the construction and function of the present invention may have different meanings depending on an intention of a user or operator and the practice in the art. Now, exemplary embodiments of the present invention will be described in detail with reference to the accompanying drawings.

Figure 1:
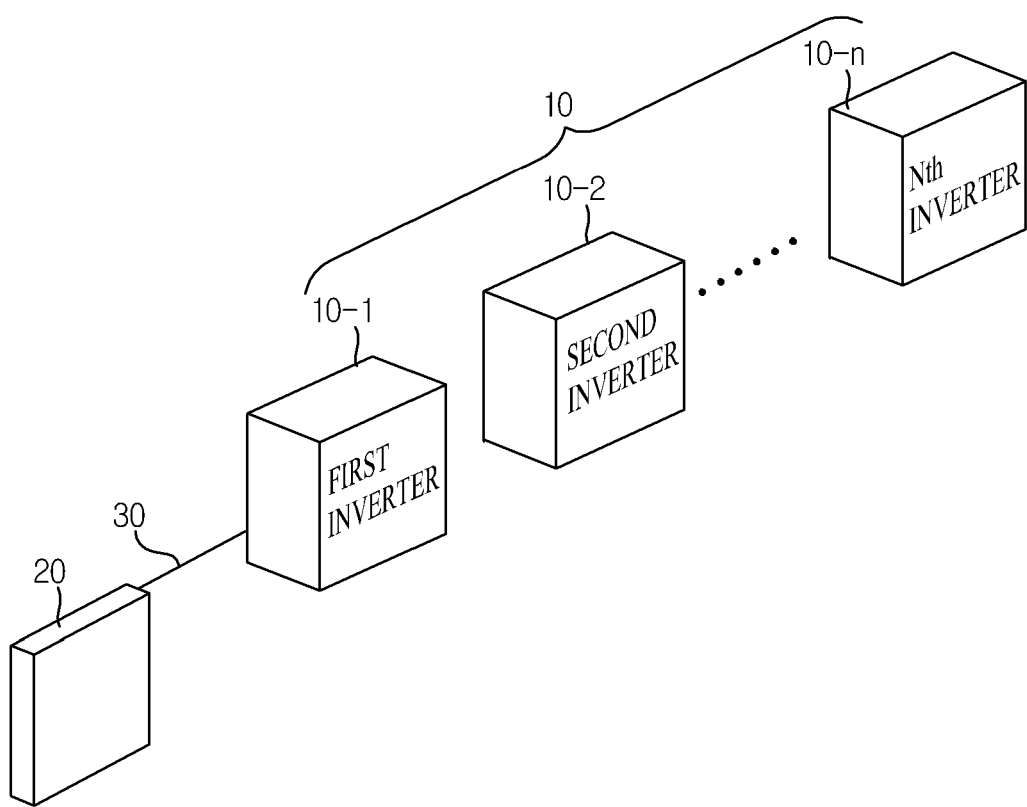
FIG. 1 is a schematic view illustrating a configuration of a system for configuring parameters of an inverter using a method for copying parameters in an inverter according to the present invention.
Figure 2:
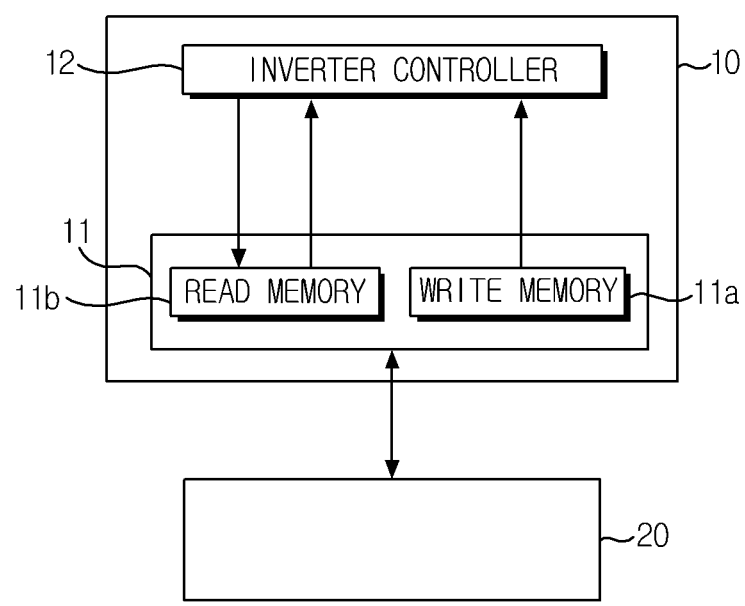
FIG. 2 is a block diagram illustrating a configuration of a copy system for copying parameters of inverter according to the present invention.
Figure 3:
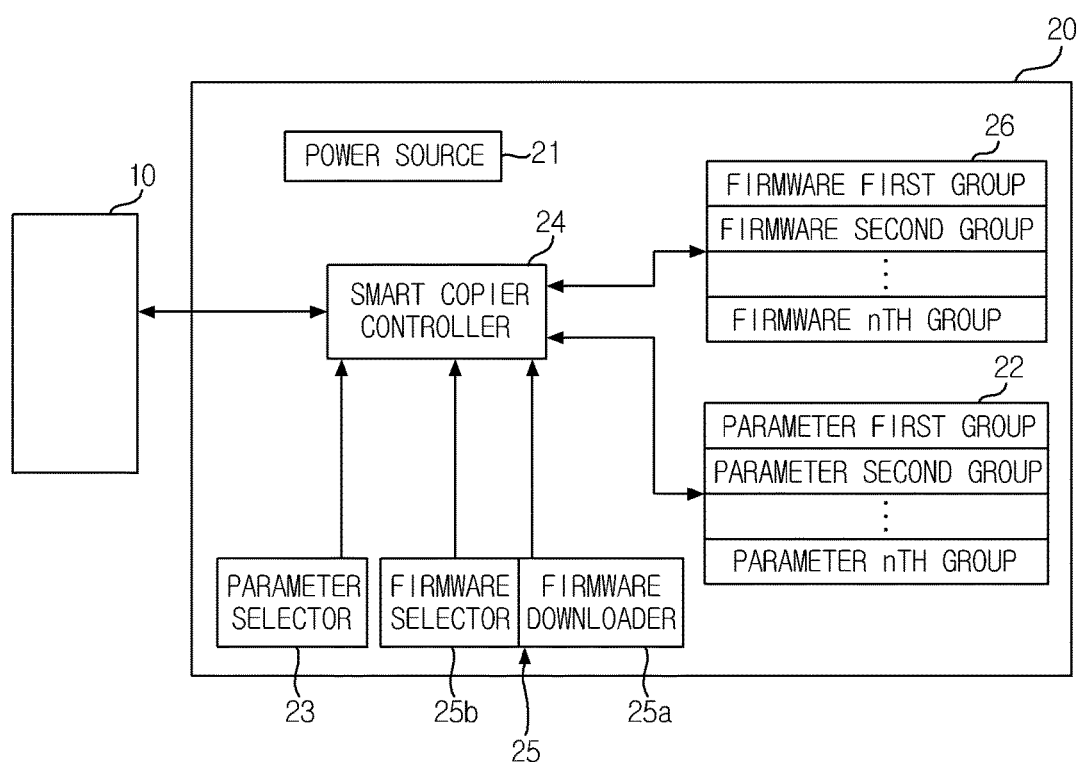
FIG. 3 is a block diagram illustrating a configuration of a smart copier in a copy system for copying parameters of inverter according to the present invention.
Figure 4:
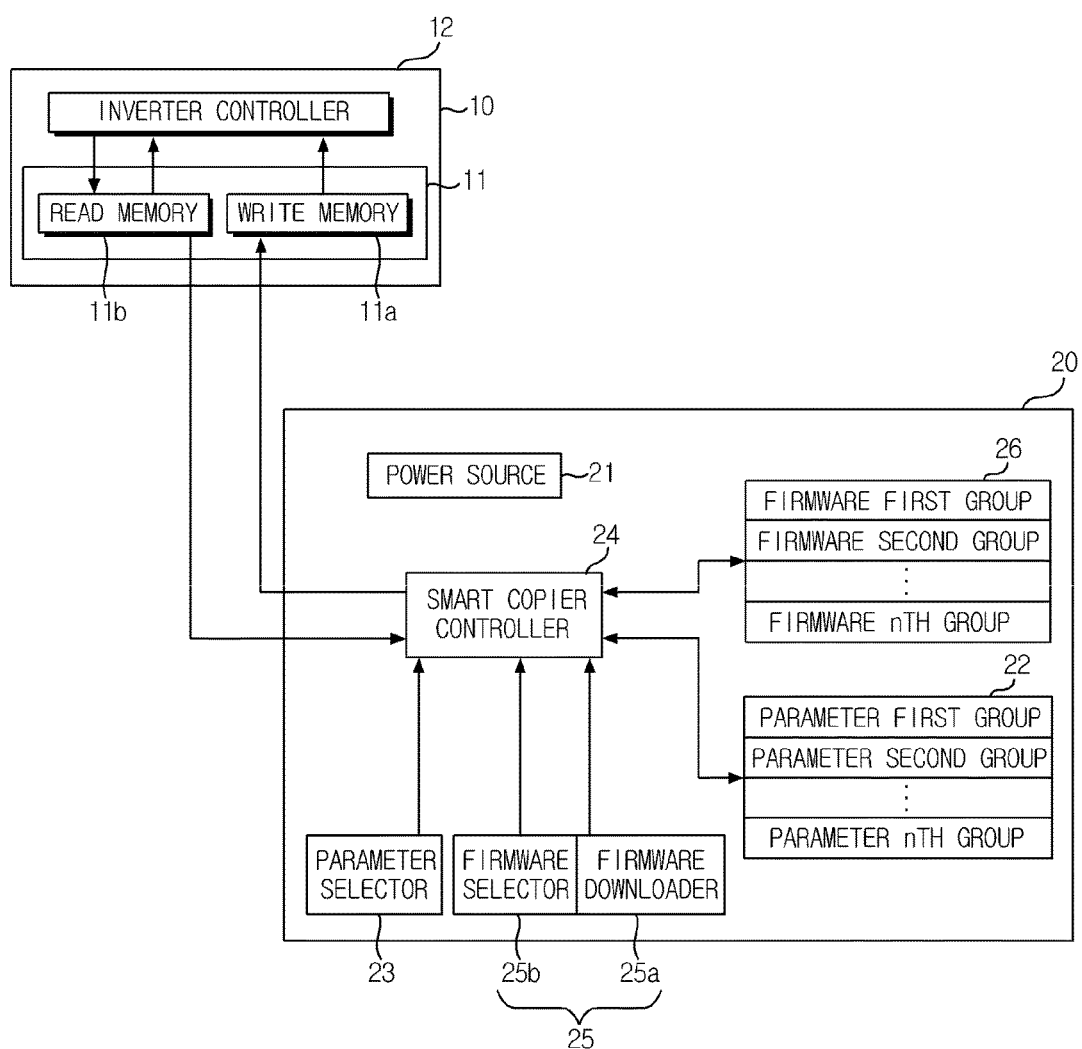
FIG. 4 is a block diagram illustrating a signal flow in a method for copying parameters of inverter according to the present invention.

FIG. 1 is a schematic view illustrating a configuration of a system for configuring parameters of an inverter using a method for copying parameters in an inverter according to the present invention, FIG. 2 is a block diagram illustrating a configuration of a copy system for copying parameters of inverter according to the present invention, FIG. 3 is a block diagram illustrating a configuration of a smart copier in a copy system for copying parameters of inverter according to the present invention, and FIG. 4 is a block diagram illustrating a signal flow in a method for copying parameters of inverter according to the present invention.

Referring to FIG. 1, the copy system for copying parameters of inverter according to the present invention using a method for copying parameters of inverter includes at least one inverters (10-1, 10-2, . . . 10-n) and a smart copier (20) stored with parameters for configuring parameters of said at least one inverter.

When parameters of the inverter (10) is configured using the smart copier (20), the smart copier (20) may transmit the parameters stored in the smart copier (20) to the inverter (10) to configure parameters of inverter while the inverter (10) and a connector (10) are connected. However, it should be noted that the connection between the smart copier (20) and the inverter (10) is not limited thereto.

Although the exemplary embodiment of the present invention has illustrated and explained a plurality of inverters such as the first inverter (10-1), the second inverter (10-2), . . . and the nth inverter (10-n), the plurality of inverters (10-1, 10-2, . . . 10-n) may be of same type of inverters performing the same function, or may be inverters of different types performing different functions.

For example, when the plurality of inverters includes mutually different types of inverters, the first inverter (10-1) may be an inverter used for controlling an elevator, the second inverter may be an inverter used for controlling an operation of a blower, and the nth inverter may be an inverter used for controlling an operation of a pump.

Hereinafter, an inverter according to the present invention, configuration of smart copier and mutual operation between the inverter and the smart copier will be described in detail with reference to FIGS. 2, 3 and 4. However, the plurality of inverters has the same configuration and will be commonly or generally referred to as inverter (10)

First, referring to FIG. 2, the inverter (10) according to the present invention includes an inverter input/output part (11) stored with parameters of inverter, and an inverter controller (12) controlling the inverter by reading the parameters stored in the inverter input/output part (11), where the inverter input/output part (11) in turn includes a write memory (11a) and a read memory (11b).

The write memory (11a) is stored with parameters of inverter transmitted from the smart copier (20), and the read memory (11b) is stored with parameters transmitted from the inverter controller (12).

Meantime, the inverter controller (12) may read the parameters stored in the write memory (11a) to control the inverter, and read the parameters stored in the read memory (11b). Furthermore, the parameters stored in the read memory (11b) may be transmitted to the smart copier (20) in response to request of the smart copier (20). That is, a series of signal flows is formed where the parameters transmitted from the smart copier (20) are stored in the write memory (11a), the parameters stored in the write memory (11a) are uploaded to the inverter controller (12) when the inverter is turned on, the inverter controller (12) controls the inverter in response to the uploaded parameters and transmits the parameters to the read memory (11b) and stores the parameters, and the stored parameters are transmitted in response to the request of the smart copier (20).

Meantime, referring to FIG. 3, the smart copier (20) may include a power part (21), parameter storage (22), a parameter selector (23) and a smart copier controller (24).

Although the smart copier (20) may be connected to an outside power source and operated by receiving the power from the outside power source, the smart copier (20) may be operated using a power supplied from the power source (21) even without being connected to a separate outside power source if the power part (21) is embedded as in the exemplary embodiment of the present invention.

That is, the power part (21) forms the smart copier (20) to supply a power source necessary for elements operated by the power supply to operate. For example, the power part (21) is preferably a re-useable, chargeable/rechargeable secondary cell and may be a lithium secondary cell or a lithium polymer secondary cell.

The parameter storage (22) is stored with parameters for controlling operation of the inverter (10), and stores parameters by reading out parameters from a PC while the PC and the smart copier (20) are connected. At this time, the smart copier (20) may be used to configure parameters on inverters of mutually different types, and may be used to configure parameters for performing the same functions on a plurality of inverters.

That is, although the smart copier (20) may be stored with a single parameter that is grouped for configuring parameters of inverter of a single type, parameters of mutually different types may be configured using a single smart copier (20) when a plurality of parameters is stored for each group.

The present exemplary embodiment of the present invention has exemplified that a plurality of parameter groups is stored in the smart copier (20). For example, the smart copier (20) may be stored with grouped parameters for each usage such as a parameter first group stored with grouped parameters necessary for controlling operation of an elevator, a parameter second group stored with grouped parameters necessary for controlling operation of a blower and a parameter nth group stored with grouped parameters necessary for controlling operation of a pump.

The parameter selector (23) selects a relevant parameter group when one parameter group is stored, and selects a parameter group adequate to a relevant inverter (10) when a plurality of parameter groups is stored. The parameter selector (23) is controlled by user selection, and outputs a parameter selection signal corresponding to the user selection, and may be formed with a selection button corresponding to a plurality of parameter groups, and when a user selects a selection button, a parameter group corresponding thereto may be transmitted to the inverter.

The smart copier controller (24) functions of writing parameters on the inverter (10) and reading out parameters from the inverter (10) as well. At this time, the smart copier controller (24) reads a parameter group corresponding to the parameter selection signal from the parameter storage (22) in response to the parameter selection signal of the parameter selector (23), transmits the read parameter group to the inverter (10) and writes the parameters on the inverter (10).

Meantime, the smart copier controller (24) writes the parameter group on the write memory (11a) of the inverter input/output part (11) in the inverter (10), and reads the parameters stored in the read memory (11b) of the inverter input/output part (11) in the inverter (10).

Referring to FIG. 4, an operation between the inverter (10) and the smart copier (20) according to a method for copying parameters of inverter according the present invention will be described.

First, the parameter selector (23) transmits to the parameter selection signal to the smart copier controller (24) in response to user control, while the smart copier (20) stored with a plurality of parameter groups in the parameter storage (22) is connected to the inverter (10). The smart copier controller (24) reads the parameter group corresponding to the parameter selection signal from the parameter storage (22), and writes the parameter group on the write memory (11a) of the inverter input/output part (11) in the inverter (10).

When the inverter (10) is turned on while the parameters are stored in the write memory (11a), a synchronization process is performed where the parameters written on the write memory (11a) is uploaded on the inverter controller (12). Thereafter, the inverter controller (12) controls the operation of the inverter in response to the uploaded parameters, where the inverter controller (12) can transmit the parameters to the read memory (11b) of the inverter input/output part (11) and read the parameters stored in the read memory (11b).

Meantime, the smart copier controller (24) of the smart copier (20) can read the parameters stored in the read memory (11b) from the read memory (11b) of the inverter (10).

Furthermore, the smart copier (20) according to the present invention may be configured to include the firmware download function and transmit the downloaded firmware to the inverter (10), and may further include a firmware controller (250 and firmware storage (26) for performing the abovementioned functions.

The firmware controller (25) may include a firmware downloader (25a) configured to output a download execution signal for downloading firmware, and a firmware selector (25b) configured to output a firmware selection signal for selecting firmware for transmitting the downloaded firmware to the inverter (10).

Now, an operation using firmware download function of the smart copier (20) according to the present invention will be described.

The firmware downloader (25a) transmits a download execution signal to the smart copier controller (24) in response to the user selection, and the smart copier controller (24) executes the firmware downloading function in response to the download execution signal and stores the downloaded firmware in the firmware storage (26) for each group.

Successively, the firmware selector (25b) outputs the firmware selection signal to the smart copier controller (24) in response to the user selection, and the smart copier controller (24) reads the firmware corresponding to the firmware selection signal in the firmware stored in the firmware storage (26) and transmits the firmware to the inverter (10).

Meantime, although the copy system for copying parameter of inverter has been described with reference to a number of limited illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the invention, the drawings and the appended claims. In addition to variations and modifications in the component parts and/or arrangements, alternative uses will also be apparent to those skilled in the art.

What is claimed is:
1. A copy system for controlling at least one inverter, the system comprising:
   a smart copier comprising:
      storage stored with parameters grouped according to use;
      a parameter selector configured to output a parameter selection signal; and
      a smart copier controller configured to select parameters stored in the storage in response to the parameter selection signal and to transmit the selected parameters to the at least one inverter; and
   the at least one inverter configured to be controlled by the selected parameters and comprising:
      a write memory;
      a read memory; and
      an inverter controller configured to control the at least one inverter,
   wherein controlling the at least one inverter comprises:
      storing the parameters received from the smart copier in the write memory;
      reading the parameters stored in the write memory;
      storing the parameters read from the write memory in the read memory; and
      performing synchronization by uploading parameters stored in the write memory to the inverter controller without user intervention when the at least one inverter is turned on, wherein the parameter selector selects a parameter group corresponding to a relevant inverter when the storage stores a plurality of parameter groups; and wherein the selected parameter group is transmitted to the relevant inverter.

2. The system of claim 1, wherein the smart copier further comprises a power supplier configured to supply power necessary for operation of the smart copier.

3. The system of claim 1, wherein:

the smart copier further comprises:
- a downloader configured to output a download execution signal for executing a firmware download;
- storage configured to store the downloaded firmware for each of a plurality of parameter groups according to use; and
- a firmware selector configured to output a firmware selection signal for selecting stored firmware; and the smart copier controller is further configured to:
- download the firmware in response to the download execution signal;
- select the downloaded firmware in response to the firmware selection signal; and
- transmit the selected firmware to the at least one inverter.

4. The system of claim 1, wherein the at least one inverter further comprises a plurality of inverters of a same type configured to perform same functions.

5. The system of claim 1, wherein the at least one inverter further comprises a plurality of inverters of different types configured to perform mutually different functions.

* * * * *